United States Patent [19]
Abe et al.

[11] Patent Number: 5,899,537
[45] Date of Patent: May 4, 1999

[54] WHEEL FOR AN AUTOMOBILE AND A MANUFACTURING METHOD THEREFOR

[75] Inventors: Kishiro Abe; Saburo Maruyama, both of Ayase; Jun Sakuma, Tokyo; Mitsunori Sugawara, Toyokawa; Takanori Saito, Fujisawa, all of Japan

[73] Assignee: Topy Kogyo Kabushiki Kaisha, Japan

[21] Appl. No.: 08/863,951

[22] Filed: May 27, 1997

Related U.S. Application Data

[63] Continuation of application No. 08/564,742, Nov. 29, 1995, abandoned.

[30] Foreign Application Priority Data

| Nov. 30, 1994 | [JP] | Japan | 6-296849 |
| Jun. 7, 1995 | [JP] | Japan | 7-140454 |
| Jul. 25, 1995 | [JP] | Japan | 7-189512 |
| Nov. 7, 1995 | [JP] | Japan | 7-288862 |

[51] Int. Cl.$^6$ .................................................. B60B 3/00
[52] U.S. Cl. ................................... 301/64.1; 301/63.1
[58] Field of Search ................................. 301/63.1, 64.1, 301/62, 67

[56] References Cited

U.S. PATENT DOCUMENTS

| 2,083,229 | 6/1937 | Horn et al. | 301/64.1 X |
| 2,307,335 | 1/1943 | Reddick | 29/159.03 |
| 2,854,309 | 2/1958 | Voorhees . | |
| 3,366,421 | 1/1968 | Bradley | 301/9 |
| 3,601,450 | 8/1971 | Baker | 301/63 R |
| 4,181,364 | 1/1980 | Reppert | 301/8 |
| 4,504,095 | 3/1985 | Edwards et al. | 301/63 R |
| 4,573,338 | 3/1986 | Daudi | 72/333 |
| 4,815,186 | 3/1989 | Daudi | 29/159.1 |
| 4,917,440 | 4/1990 | Daudi | 301/9 DN |
| 5,380,071 | 1/1995 | Kier, Jr. | 301/63.1 |
| 5,417,476 | 5/1995 | Hasegawa et al. | 301/63.1 |

FOREIGN PATENT DOCUMENTS

| 871754 | 5/1942 | France | 301/64.1 |
| 2134485 | 2/1972 | Germany | 301/63.1 |
| 50-41204 | 4/1975 | Japan . | |
| 58-116944 | 7/1983 | Japan . | |
| 60-117201 | 8/1985 | Japan . | |
| 37 9902 | 1/1991 | Japan . | |
| 214 076 | 3/1941 | Switzerland . | |
| 478 510 | 1/1938 | United Kingdom . | |
| 754 725 | 8/1956 | United Kingdom . | |
| 754725 | 8/1956 | United Kingdom | 301/63.1 |
| 2 189 201 | 10/1987 | United Kingdom . | |

Primary Examiner—Russell D. Stormer
Attorney, Agent, or Firm—Pillsbury Madison & Sutro, LLP

[57] ABSTRACT

A wheel for an automobile and a manufacturing method therefor wherein, in manufacturing a disc material portion from a substantially flat square plate, a length of the side of the substantially flat square plate is selected so that, after the subsequently formed disc is pressed into a rim, a most recessed portion of a ventilation is located axially outside a center of curvature of a well radius of the rim.

4 Claims, 6 Drawing Sheets

WHEEL FOR AN AUTOMOBILE AND A MANUFACTURING METHOD THEREFOR

This is a continuation of application Ser. No. 08/564,742, filed on Nov. 29, 1995.

BACKGROUND OF THE INVENTION

1. Field of the Invention

The present invention relates to a wheel for an automobile and a manufacturing method therefor which can lighten the wheel to a great extent without decreasing its fatigue strength.

2. Description of Related Art

As illustrated in FIGS. 8 and 9, an automobile wheel includes a disc 1 and a rim 2 connected to each other by spot welding 3. The spot welding 3 necessarily includes a stress concentrated portion 5 (FIG. 10) which tends to weaken the wheel. To compensate, the rim 2 and the disc 1 are engaged with each other axially over a relatively large length m' (FIG. 9). Clearance between the rim and the disc 1 is kept as small as possible because a tight engagement increases the strength of the wheel and decreases automobile vibration.

Disc 1 is manufactured, as generally illustrated by two dotted lines in FIG. 3, by die-cutting a substantially square flat plate having a side of length L' along a circle having a diameter D' greater than L', thereby obtaining a disc material portion 4. Disc material portion 4 is then formed into a disc shape to obtain a disc. In this instance, an arcuate portion 4a of the disc material portion 4 is formed into an axial end 4a of the disc flange shown in FIG. 9. Straight portion 4b of the disc material is formed into an arcuate recessed portion (or ventilation) 4b of the disc of FIG. 9. To increase the strength at the weld portion and to suppress radial displacements of the rim wall from a true circle, as described above, a most recessed portion 4c of the ventilation 4b is located axially inside a center of curvature 6 of the well radius between a rim well 8 and a rim side wall 9 so that a disc flange 7 contacts the rim well 8 at all circumferential portions of the disc flange 7. It has been thought from past experiences that if the most recessed portion 4c of the ventilation 4b were located axially outside the center of curvature 6 of the well radius, the strength of the welding portion would be greatly decreased and radial displacements of the rim from a true circle would increase. As a result, the length L' of the side of the disc material portion 4 is determined from the position of the most recessed portion of the ventilation when the disc 1 is pressed into the rim 2. More particularly, an axial length m' of 5 to 7 mm remains for engagement between the rim 2 and the disc 1 at the most recessed portion of the ventilation.

Despite that, there are two situations where the most recessed portion of a ventilation is located axially outside the center of well radius of a rim: one is where a periphery of the ventilation is bent to reinforce the ventilation, as illustrated in FIGS. 11 and 12, and another is where a specially shaped blank is used as a disc material as illustrated in FIGS. 13 and 14. These situations have particular problems described below.

More particularly, in the disc shown in FIGS. 11 and 12, the ventilation has an axially bent portion or rib G. Rib G is defined as a portion having a cross section of a different shape from that of a portion of the disc, other than the most recessed portion and located on the same radius as the most recessed portion with respect to a center of the disc. The bent portion G extends also circumferentially, and at each circumferential end the bent portion G of each ventilation has two curved portions having respective curvatures $R_1$ and $R_2$ opposite to each other. Because of this bent portion G: (1) A volume inside the wheel is reduced by $\Delta R$ in radius so that the space available for mounting a brake is decreased. (2) Rigidity of the disc becomes large relative to that of the rim, so that relatively large radial displacements are caused in the rim, which lower the fatigue strength and life of the weld portion. Increased rigidity of the circumferential ends of the ventilation also increases rim deformation, which increases the radial displacements of the rim. (3) It is necessary to increase a size of the disc material portion in proportion to an axial length $L_1$ of the bent portion.

Further, in the disc shown in FIGS. 13 and 14, since the disc material has an angularly cut portion K, the disk also has an angular portion K' in the ventilation which shortens the fatigue life of the wheel. Use of this type of disk in automobiles is therefore restricted.

However, in the wheel of the type generally shown in FIG. 9, the rim and the disc are frequently welded to each other by a weld which is continuous, at least locally, in a circumferential direction of the wheel. As a result, excess strength and rigidity of the wheel is created.

SUMMARY OF THE INVENTION

An object of the present invention is to provide a wheel for an automobile and a manufacturing method therefor where the above-described surplus of strength and rigidity is used to enable down-sizing of the disc material portion so as to lighten the disc without shortening the life of the wheel.

A wheel for an automobile in accordance with the present invention includes a rim including a well radius having a center of curvature, and a disc including a disc flange and a ventilation. The ventilation includes a substantially arcuate periphery recessed axially outwardly from an axial end or edge of the disc flange. The ventilation includes a most recessed portion located axially outside of the center of curvature of the well radius of the rim by at least about 5 mm. The most recessed portion of the ventilation has a cross section with substantially the same shape as a portion of the disc other than the most recessed portion, located on the same radius as the most recessed portion.

A method for manufacturing a wheel for an automobile in accordance with the present invention includes the steps of manufacturing a disc material portion, forming the disc material portion into a disc, and welding the disc to a rim. In the disc material portion manufacturing step, the disc material portion is manufactured by eliminating four corners from a substantially square flat plate along a circle having a diameter greater than a length of a side of the substantially square flat plate. In the disc forming step, the disc material portion is formed into a disc having four flanges, each having an axial end, and four ventilations, each having a most recessed portion recessed axially outwardly from the axial end of the each disc flange. In the welding step, the disc is welded to a rim which includes a well, a side wall, and a well radius having a center of curvature. During the disc material portion manufacturing step, the length of the side of the substantially square flat plate is determined so that the most recessed portion of the each ventilation of the disc is located axially outside the center of curvature of the Pell radius of the rim by at least about 5 mm. During the disc forming step, the each ventilation is formed so as to have a substantially arcuate periphery axially recessed from the axial end of the disc flange. Further, during the disc forming step, the most recessed portion of the each ventilation is formed so as to have a cross section of the same shape as a cross section of a portion of the disc other than the most recessed portion and is located on the same radius as the most recessed portion.

BRIEF DESCRIPTION OF THE DRAWINGS

The above and other objects, features, and advantages of the present invention will become more apparent and will be more readily appreciated from the following detailed description of the preferred embodiment of the present invention, in conjunction with the accompanying drawings, in which.

DETAILED DESCRIPTION OF THE PREFERRED EMBODIMENT

Figure 1:
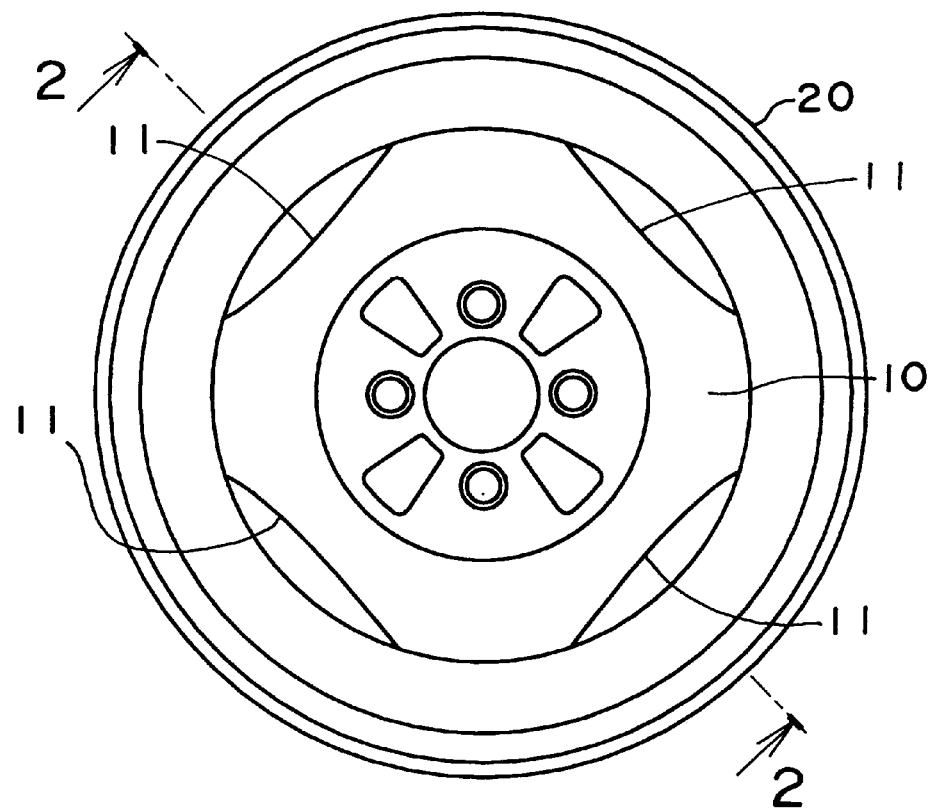
FIG. 1 is a front elevational view of a wheel for an automobile in accordance with one embodiment of the present invention.
Figure 2:
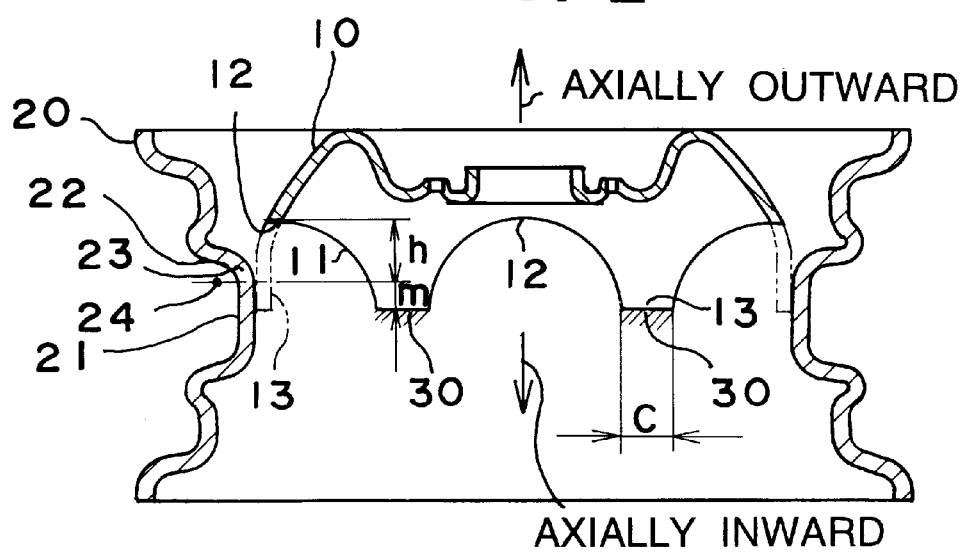
FIG. 2 is a cross-sectional view of the wheel of FIG. 1 taken along line 2—2.

As illustrated in FIGS. 1 and 2, a wheel for an automobile is composed of a disc 10, made, for example, by drawing and a rim 20 which are welded to each other. More particularly, the disc 10 includes a central portion, four disc flanges (axially raised portions, or flange portions) 13 protruding from a periphery of the central portion and four ventilations (flange openings, or recessed spaces or recesses) 11. The rim 20 includes a well (a drop portion or a well portion) 21, a side wall 22, a well radius (a curved portion or a curved radius portion) 23 connecting the well 21 and the side wall 22. The well radius 23 has a center of curvature 24. The disc 10 is welded to the rim 20 at the disc flanges 13 and the rim well 21 using welding other than spot welding. The welding may be arc welding, laser welding, fillet welding, or a through welding. The weld portion is denoted by reference numeral 30.

Figure 11:
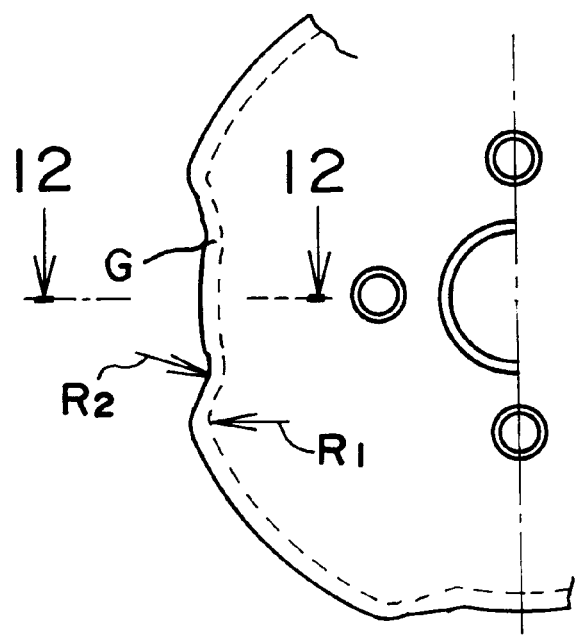
FIG. 11 is a partial, front elevational view of a conventional disc of the type where a periphery of a ventilation is bent.
Figure 12:
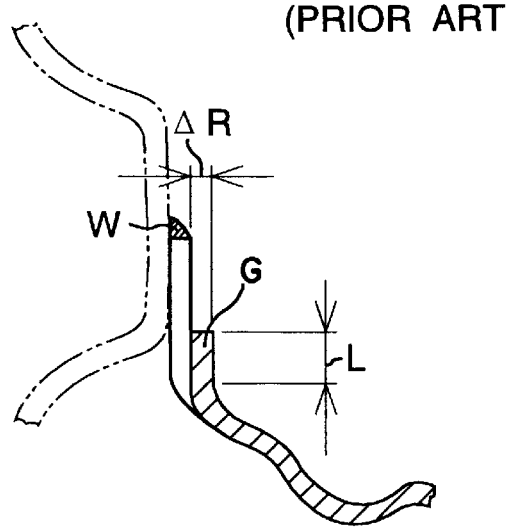
FIG. 12 is a cross-sectional view of a portion of the disc close to the ventilation of FIG. 11 taken along line 12—12.
Figure 14:
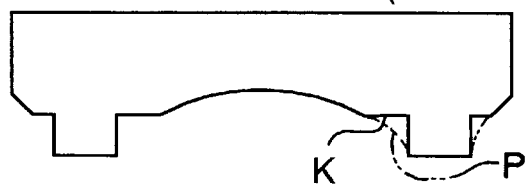
FIG. 14 is a plan view of a portion of a disc made from the blank of FIG. 13, manufactured by drawing.

Each disc flange 13 includes an axial end. Each ventilation 11 is positioned between adjacent disc flanges 13. Each ventilation 11 includes a substantially arcuate periphery recessed axially outwardly from the axial end of the disc flange 13. Because of the substantially arcuate periphery of each ventilation 11, the disc 10 does not have the shape of the ventilation shown in FIG. 14. Each ventilation 11 includes a most recessed portion (or a radially inwardly-directed extremum) 12 which is located axially outside of the center of curvature 24 of the well radius 23 of the rim 20. The most recessed portion 12 of each ventilation 11 has a cross section with the same shape as a portion of the disc 10 other than the most recessed portion 12, and which is located on the same radius as the most recessed portion 12 with respect to a center of the disc 10 after the disc 10 is pressed into the rim 20. Therefore, the ventilation 11 does not include a bent portion G, as shown in FIGS. 11 and 12.

Figure 3:
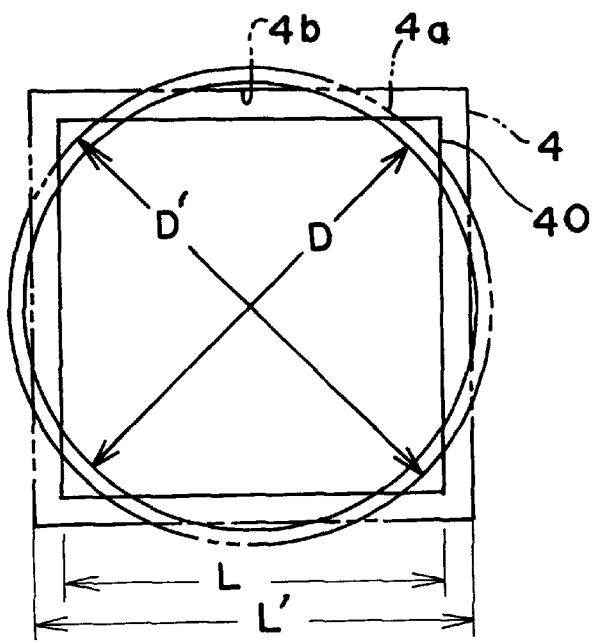
FIG. 3 is a plan view of a flat plate for use in manufacturing the disc of FIG. 1.
Figure 4:
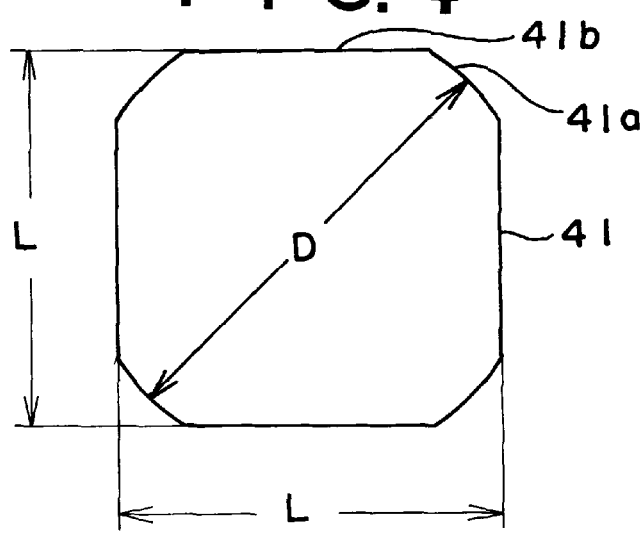
FIG. 4 is a plan view of a disc material portion manufactured by eliminating four corners of the flat plate of FIG. 3.

In a method for manufacturing a wheel for an automobile in accordance with one embodiment of the present invention, as illustrated in FIGS. 3 and 4, a disc material portion (or a first portion) 41 is manufactured by eliminating four corners from a substantially square flat plate 40 along a circle having a diameter D greater than a length L of a side of the substantially square flat plate 40.

Figure 5:
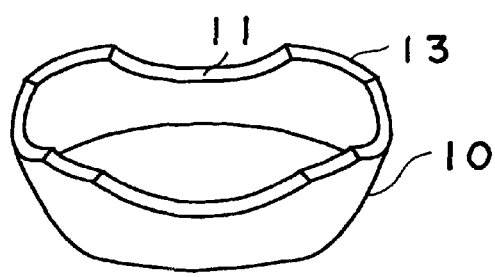
FIG. 5 is a perspective view of a disc manufactured by forming the disc material portion of FIG. 4 into the shape of a disc.

Then, the disc material portion 41 is formed by drawing into a disc 10, as shown in FIG. 5. The disc 10 includes four disc flanges 13 and four ventilations 11. An arcuate portion 41a at each of the four corners of the disc material portion 41 is formed into the axial end of the disc flanges 13 which are located in a plane perpendicular to an axis of the disc. A straight side 41b of the disc material 41 is formed into the periphery of the ventilation 11 in FIG. 5.

On the other hand, the rim 20 is manufactured, independently, by curvingly bending a flat plate, butt-welding abutted portions of the curved plate to produce a cylindrical element, and forming the cylindrical element into the shape of a disc. The rim 20 includes a well 21, a side wall 22, and a well radius 23 connecting the well 21 and the side wall 22.

The disc 10 is welded to the rim 20 at the disc flanges 13 and at the rim well 21. Welding is not conducted at the ventilations 11.

In manufacturing the disc material portion 41, the length L of the side of the substantially square flat plate 40 is selected so that the most recessed portions 12 of the ventilations 11 are located axially outside the center of curvature 24 of the well radius 23 of the rim 20 by at least about 5 mm.

Figure 8:
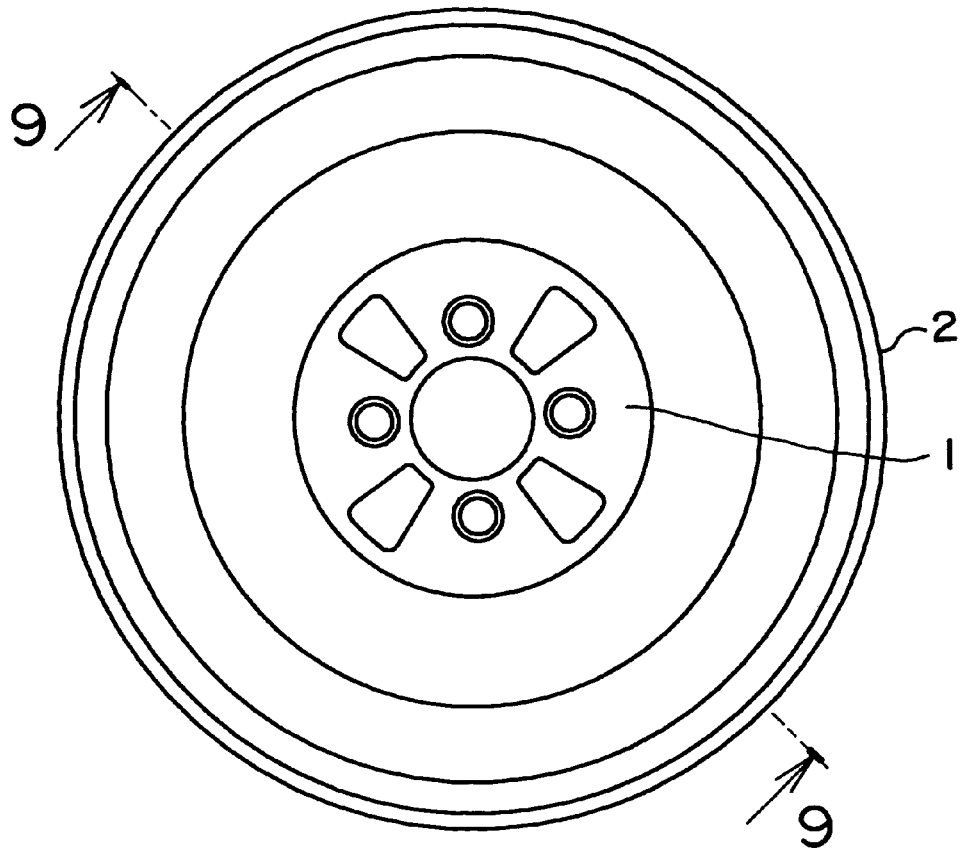
FIG. 8 is a front elevational view of a conventional wheel for an automobile.
Figure 9:
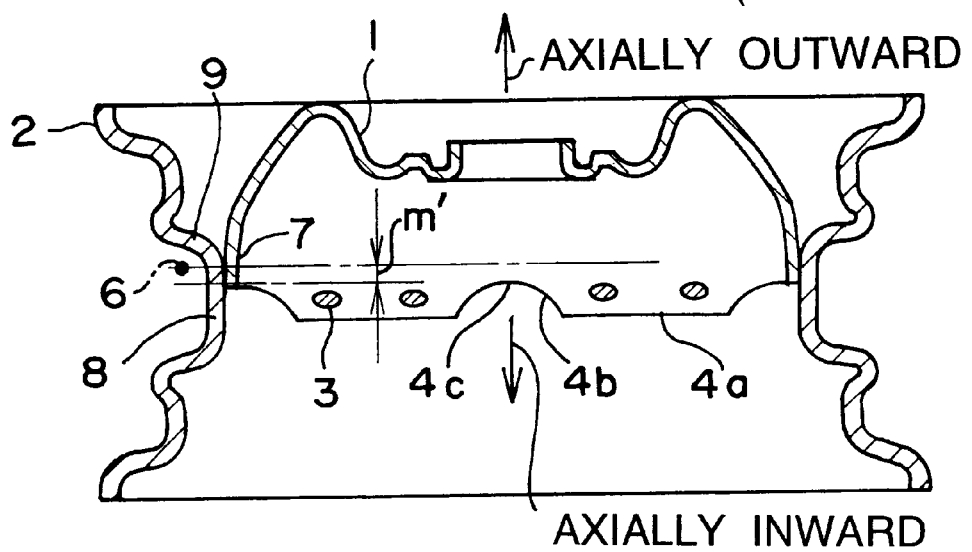
FIG. 9 is a cross-sectional view of the conventional wheel of FIG. 8 taken along line 9—9.
Figure 10:
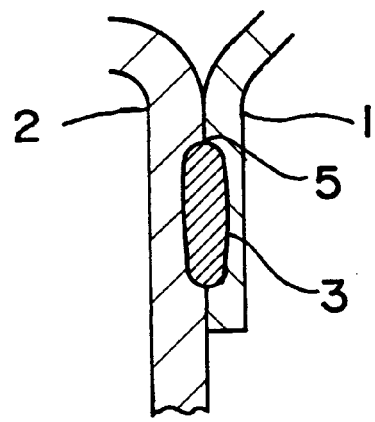
FIG. 10 is an enlarged cross-sectional view of a spot-welded portion and an adjacent area of the conventional wheel of FIG. 8.

More particularly, if the length L' of the side of flat plate 4 is relatively long in FIG. 3, the axial depth of the ventilation 11 will be small in FIG. 5. As a result, the most recessed portion 4c of the ventilation will be at a position axially inside the center of curvature 6 of the well radius, as shown in FIG. 9. In contrast, when the length L of the flat plate 40 is relatively short, an axial depth of the ventilation 11 will be large. As a result, the most recessed portion 12 of the ventilation is at a position axially outside the center of curvature 24 of the well radius, as shown in FIG. 2. Thus, in the conventional wheel, as shown in FIGS. 8 and 9, the rim 2 and the disc 1 contact each other over an entire circumferences thereof. In the wheel according to the present invention, however, as shown in FIGS. 1 and 2, the rim 20 and the disc 10 contact each other at only portions other than the ventilations 11.

As a result, when manufacturing the substantially square flat plate 40, length L' of the side of the plate 40 is shortened to length L, so that the amount of material and the weight thereof are decreased at a rate of $(L)^2/(L')^2$, which becomes very significant. For example, in the case of a disc for an automobile, the length of a side of the substantially square flat plate can be reduced by about 14 to 17%, so that the amount of material and the weight thereof are reduced by as much as 20 to 30%.

Figure 13:
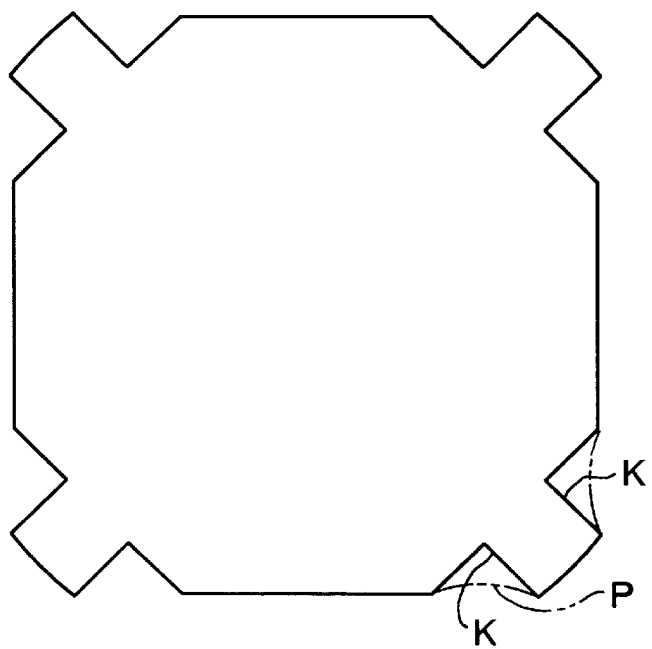
FIG. 13 is a partial plan view of a special type blank for a conventional disc.

In forming the disc 10, the ventilations 11 of the disc 10 are formed so as to have a substantially arcuate periphery axially recessed from the axial end of the disc flanges 13, after the disc 10 is pressed into the rim 20. Therefore, the conventional ventilations of FIG. 14, having an angular portion K', are not included within the ventilations of the disc of the present invention. However, ventilations which have configurations P and P' shown in FIGS. 13 and 14 having shallow arcuate peripheries are included within the present invention.

Further, in forming the disc 10, the most recessed portion 12 of each ventilation 11 is formed so as to have a cross section of the same shape as a cross section of a portion of the disc other than the most recessed portion 12 and located on the same radius as the most recessed portion 12 with respect to the center of the disc. Therefore, the ventilations of FIG. 12 having a bent portion G are not included within the ventilations of the disc of the present invention.

In welding the disc 10 to the rim 20, the disc 10 is welded to the rim 20 at each disc flange 13 (more particularly, at the axial end of each disc flange 13 or at a position axially outwardly spaced from the axial end of the disc flange by a distance equal to or less than about 10 mm, for example) by a weld which is at least locally continuous over a length at least 30 mm in a circumferential direction of the disc.

In the wheel and the manufacturing method therefor, the following conditions should be preferably satisfied so that a good torque transmittance characteristic is sufficiently maintained and so that radial dimensional deviation and a fatigue strength are not degraded.

First, to maintain sufficient torque transmitting strength (shear strength), in the disc material manufacturing step, length L of the side of the substantially square flat plate 40 and diameter D at which the corners of the substantially square flat plate 40 are eliminated and selected so that the circumferential length C (FIG. 2) of the axial end of each disc flange 13 is equal to or greater than about 30 mm. Therefore, in the subsequent welding step, each disc flange 13 is welded to the well 21 over a circumferential length equal to or greater than about 30 mm. A total weld length of the welds at the four disc flanges 13 is 120 mm (4×30 mm) or more, so that the torque transmitting strength is not smaller than that obtained in the conventional weld structure including eight spot welds (8×nugget diameter 15 mm=120 mm).

With respect to radial displacement of the rim from a true circle, a variance in axial position of the most recessed portion of each ventilation greatly affects the radial displacements of the rim. More particularly, in a case where the axial positions of the most recessed portions of the four ventilations are coincident with one another, no problem occurs. However, since such a positional coincidence cannot be expected in drawing, a variance in position necessarily occurs. In a case where the most recessed portions of the four ventilations are axially close to the center of curvature 24 of the well radius 23, some of the most recessed portions may be located axially inside the center of curvature 24 of the well radius 23, causing an increase in the rigidity of the wheel. Other most recessed portions may be located axially outside the center of curvature 24 of the well radius 23, causing a decrease in the rigidity of the wheel. As a result, a relatively large imbalance in the rigidity of the wheel is caused so that the disc 10 is easily inclined relative to the rim 20 to thereby increase radial displacements of the rim 20.

Figure 6A:
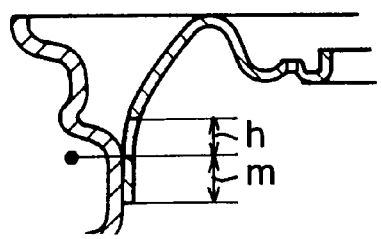
FIG. 6 is a graph illustrating a relationship between a radial displacements of a rim from a true circle and a distance h (mm) between a most recessed portion of a ventilation and a center of curvature of a well radius of a rim.
Figure 6B:
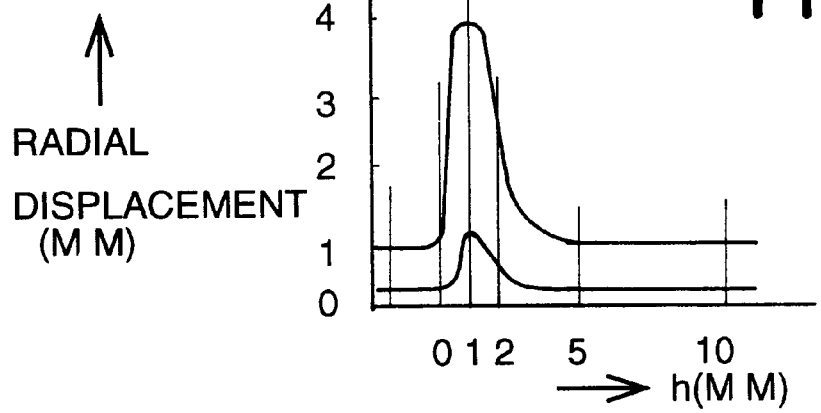

FIG. 6 illustrates the radial displacements at the rim bead seat which were measured in tests conducted using automobile wheels (wheels having rim bead seat diameters of 12–16 inches and wheel widths of 4–7 inches). As seen from FIG. 6, the radial displacement is amplified in the range of h of ±1 mm on opposite sides of the center of 1 mm. The radial displacement is relatively small in the range of h equal to or greater than 2 mm, and is stably small in the range of h equal to or greater than 5 mm. Therefore, the conventional concept that the radial displacement would be amplified if the most recessed portion of the ventilation were spaced axially outwardly from the rim radius can be dissipated by selecting h to be about 2 mm or more, and more preferably, about 5 mm or more. There is an upper limit to h of selecting C (a circumferential length of the axial end of each disc flange 13) of about 30 mm or more.

Figure 7:
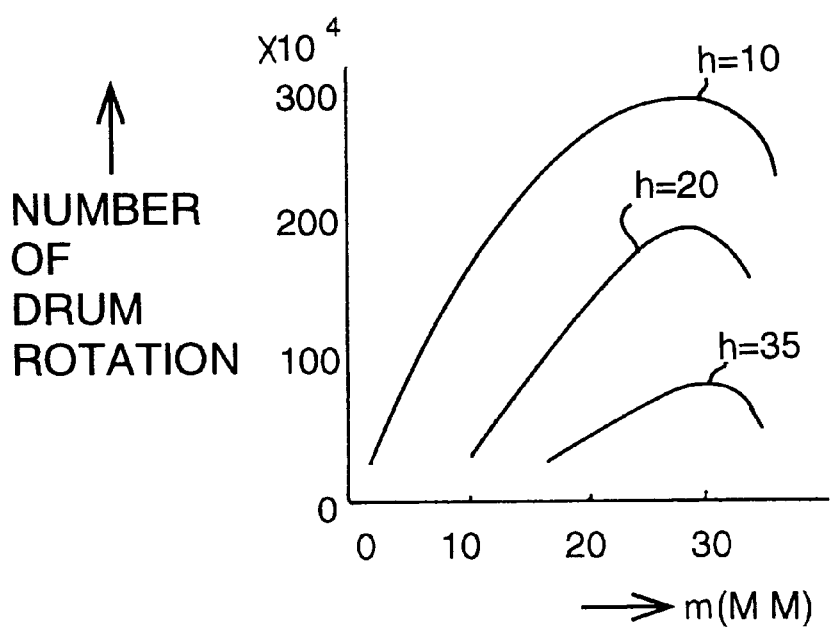
FIG. 7 is a graph illustrating a relationship among h, a distance between an axial end of a disc flange and the center of curvature of the well radius of the rim, and a life of the wheel.

With respect to a fatigue strength, it is conceived that an axial distance m between the axial end of each disc flange 13 and the center of curvature 24 of the well radius 23 (an axial length of engagement between the rim 20 and the disc 10) also affects the fatigue strength of the weld portion of the wheel. Thus, life tests on a drum were conducted by adding parameter m to parameter h (an axial distance between the most recessed portion 12 of the ventilation and the center of curvature 24 of the well radius 23). FIG. 7 shows the test results wherein the fatigue strength of the wheel is shown in terms of a number of rotations of the wheel drum before cracking starts at the weld portion. As understood from FIG. 7, the life span of a wheel can be controlled by selecting an optimum combination of h and m.

More particularly, as seen in FIG. 7, too small or too large a value of m shortens the wheel life. This is because a value of m which is too small decreases the rigidity of the disc 10 relative to the rim 20, thereby increasing deformations in the disc 10 such that stresses are concentrated on the disc 10. On the other hand, a value of m which is too large increases deformations in the rim 20 so that stresses are concentrated on the rim. Since the life of the wheel is extended when m is such that the deformation of the disc and the deformation of the rim are balanced with each other, such value of m should be selected.

In this instance, if the value of h is 30 mm or less, an ideal combination of m and h as can satisfy a life span of about 800,000 cycles can be found in FIG. 7 by selecting a value of m in the range of about 3 mm to about 40 mm.

According to the wheel in accordance with the present invention, the following advantages are obtained:

First, because the most recessed portion 12 of each ventilation 11 is located axially outside the center of curvature 24 of the well radius 23 of the rim 20, a substantially square flat plate having a size smaller than a conventional plate can be used as a plate material for the disc material portion 41, so that the size of the plate material portion and the weight of the disc 10 can be greatly decreased. Further, because the periphery of each ventilation 11 is not bent axially, unlike the conventional disc, problems such as interference between the bent portion and a brake, decrease in the life of the weld portion due to excessive disc rigidity of the disc, and decrease in the material utilization rate due to the up-sizing of the substantially square flat plate by an axial length of the bent portion do not occur.

Second, in a case where a circumferential length C of the axial end of each disc flange 13 is selected to be about 30 mm or more and a circumferential length of the weld at each disc flange 13 is selected to be about 30 mm or more, torque transmitting strength substantially equal to or greater than that of the conventional wheel can be obtained.

Third, where the most recessed portion 12 of each ventilation 11 is axially spaced from the center of curvature 24 of the well radius 23 of the rim 20 by a distance equal to or more than about 5 mm, radial displacements of the rim 20 are suppressed, and the life span of the wheel is not shortened. Further, vibrational characteristics of an automobile are not degraded.

Fourth, in a case where the axial end of the disc flange 13 is axially inwardly spaced from the curvature center 24 of the well radius 23 by a distance equal to or more than about 30 mm, an optimum combination of h and m can be found with h being equal to or less than about 30 mm.

Further, according to the method for manufacturing a wheel in accordance with the present invention, the following advantages are obtained.

First, because the length L of the substantially square flat plate 41 is determined so that the most recessed portion 12 of each ventilation 11 is located axially outside the center of curvature 24 of the well radius 23, a substantially square flat plate smaller than a conventional one can be used to manufacture the disc material portion 41, so that the amount of the plate material and the weight of the resultant disc 10 can be greatly decreased. Further, because the periphery of each ventilation 11 is not bent axially, unlike the conventional disc, problems such as interference between a bent portion and a brake, decrease in the life of the weld portion of the wheel due to excessive rigidity of the disc, and decrease in the material utilization rate due to the up-sizing of the substantially square flat plate by an axial length of a bent portion do not occur.

Second, in the disc material portion manufacturing, when the length L of the side of the substantially square flat plate and the diameter D at which corners of the substantially square flat plate are eliminated are determined so that the circumferential length C of the axial end of each disc flange 13 is about 30 mm or more, and, during welding, each disc flange 13 is welded to the well of the rim over a circumferential length equal to or greater than about 30 mm, torque transmitting strength substantially equal to or greater than that of the conventional wheel can be obtained.

Third, in manufacturing the disc material portion, if the length L of the side of the substantially square flat plate and the diameter D at which the corners are eliminated are selected so that the most recessed portion 12 of each ventilation 11 is axially outwardly spaced from the center of curvature 24 by about 5 mm or more, radial displacements of the rim 20 are suppressed, and life span is not shortened. Further, vibrational characteristics of an automobile are not degraded.

Fourth, when the length L of the side of the substantially square flat plate and the diameter D at which the corners are eliminated are selected so that the axial end of the disc flanges 13 are axially inwardly spaced from the center of curvature 24 of the well radius 23 by a distance at least about 3 mm and no greater than about 40 mm, an optimum combination of h and m can be found where h is equal to or less than about 30 mm.

Although only one embodiment of the present invention has been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A wheel for an automobile, the wheel having a central axis, the wheel having an axially inward side facing an axle and an axially outward side facing away from the axle, the wheel comprising:

a drop-center-type, one-piece integral rim including:

a well portion extending substantially parallel to the central axis, said well portion having a radially inside surface and an axially outward edge;

a radially extending side wall provided adjacent to said axially outward edge of said well portion; and a curved radius portion joining said well portion and said side wall, said curved radius portion having a center of curvature; and a central disc disposed so as to be substantially surrounded by said rim, said disc including a central portion and a plurality of discrete flange portions, said central portion having an axially inward peripheral edge, each said flange part protruding from said axially inward peripheral edge of said central portion, each of said plurality of flanke portions of said disc having a radially outside surface and contacting said radially inside surface of said well portion of said rim, said plurality of flange portions being joined and welded to said radially inside surface of said well portion of said rim and being circumferentially spaced apart from one another alone an entire length thereof so as to define ventilations therebetween, wherein each ventilation has a radially inwardly-directed extremum defined as a free edge at a radial extremum location, each extremum of each ventilation being located axially outward of said center of curvature of said curved radius portion of said rim by at least about 5 mm, wherein a cross section of said disc at a plane coincident with the central axis and passing through at least one said extremum has the same shape as a cross section of said disc at a plane coincident with the central axis up to a radial position corresponding to said radial extremum location and passing through at least one of said flange portions, wherein a radius from a center of said disc to at least one said extremum is the same as a radius from a center of said disc to a point on at least one said flange portion having the same axial position along the central axis as said extremum.

2. A wheel according to claim 1, wherein said plurality of flange portions are joined to said well portion by welding.

3. A wheel according to claim 1, wherein each flange portion has an axially inward end having a circumferential length of at least about 30 mm, wherein each flange portion is joined to said well portion by a weld at least about 30 mm long.

4. A wheel according to claim 1, wherein each flange portion has an end which is axially inward of said center of curvature by a distance between about 3 mm and about 40 mm.

* * * * *